United States Patent
Czimmek et al.

(10) Patent No.: US 10,364,758 B2
(45) Date of Patent: Jul. 30, 2019

(54) HIGH PRESSURE GAS PHASE INJECTOR

(71) Applicant: Continental Automotive Systems, Inc., Auburn Hills, MI (US)

(72) Inventors: Perry Robert Czimmek, Williamsburg, VA (US); Michael J Hornby, Williamsburg, VA (US); Douglas Edward Cosby, Newport News, VA (US)

(73) Assignee: Continental Powertrain, USA, LLC, Auburn Hills, MI (US)

( * ) Notice: Subject to any disclaimer, the term of this patent is extended or adjusted under 35 U.S.C. 154(b) by 0 days.

(21) Appl. No.: 15/844,858

(22) Filed: Dec. 18, 2017

(65) Prior Publication Data
US 2018/0171888 A1 Jun. 21, 2018

Related U.S. Application Data

(60) Provisional application No. 62/436,827, filed on Dec. 20, 2016.

(51) Int. Cl.
| | |
|---|---|
| *F02D 19/02* | (2006.01) |
| *F02M 21/02* | (2006.01) |
| *F02M 63/00* | (2006.01) |
| *F02M 61/02* | (2006.01) |

(52) U.S. Cl.
CPC ......... *F02D 19/024* (2013.01); *F02D 19/022* (2013.01); *F02M 21/0239* (2013.01);
(Continued)

(58) Field of Classification Search
CPC ...... F02D 19/02; F02D 19/024; F02D 19/022; F02M 21/0239; F02M 21/0245;
(Continued)

(56) References Cited

U.S. PATENT DOCUMENTS

| | | | |
|---|---|---|---|
| 4,240,468 A | 12/1980 | Brand et al. | |
| 5,033,716 A | 7/1991 | Mesenich | |

(Continued)

FOREIGN PATENT DOCUMENTS

| | | | |
|---|---|---|---|
| AT | 209110 B | 5/1960 | |
| DE | 3834447 A1 | 4/1990 | |

(Continued)

OTHER PUBLICATIONS

International Search Report and Written Opinion of the International Searching Authority dated Jan. 30, 2018 for corresponding PCT application No. PCT/US2017/067226.

*Primary Examiner* — Hieu T Vo

(57) ABSTRACT

An injector, including: a moveable armature having a bore and upper and lower control surfaces; a lower housing including a bore and upper and lower stationary control surfaces; and a flow geometry defined along an exterior of the armature. The armature includes a transverse flow path fluidly coupled with the armature bore and the flow geometry. The lower housing includes a transverse flow path fluidly coupled with the lower housing bore. Upon moving the armature from a first position to a second position, a first flow path is formed between the flow geometry and the lower housing transverse flow geometry through a space between the lower stationary control surface and the lower armature control surface, and a second flow path is formed between the armature bore and the lower housing transverse flow geometry through a space between the upper stationary control surface and the armature upper control surface.

25 Claims, 14 Drawing Sheets

(52) U.S. Cl.
CPC .... *F02M 21/0245* (2013.01); *F02M 21/0248* (2013.01); *F02M 21/0254* (2013.01); *F02M 21/0257* (2013.01); *F02M 21/0269* (2013.01); *F02M 61/02* (2013.01); *F02M 63/008* (2013.01); *F02M 63/0022* (2013.01); *F02M 63/0031* (2013.01); *F02M 63/0078* (2013.01); *Y02T 10/32* (2013.01)

(58) Field of Classification Search
CPC ........... F02M 21/0248; F02M 21/0254; F02M 21/0257; F02M 21/0269; F02M 61/02; F02M 63/0022; F02M 63/0031; F02M 63/0078; F02M 63/008
See application file for complete search history.

(56) References Cited

U.S. PATENT DOCUMENTS

| | | | | |
|---|---|---|---|---|
| 5,542,610 | A * | 8/1996 | Augustin | F02M 47/027 239/533.8 |
| 6,732,959 | B2 * | 5/2004 | Delaney | F02M 51/0621 239/585.1 |
| 7,229,064 | B2 | 6/2007 | Miller et al. | |
| 8,616,474 | B2 * | 12/2013 | Czimmek | F02M 51/0667 239/585.1 |
| 2005/0258385 | A1 | 11/2005 | Miller et al. | |
| 2014/0224903 | A1 | 8/2014 | Fujino et al. | |
| 2015/0041569 | A1 | 2/2015 | Grandi | |
| 2016/0245249 | A1 | 8/2016 | Izzo | |

FOREIGN PATENT DOCUMENTS

| | | |
|---|---|---|
| DE | 10353011 A1 | 6/2005 |
| DE | 102009002892 A1 | 11/2010 |
| DE | 102013222030 A1 | 4/2015 |
| EP | 1801410 B1 | 6/2007 |
| EP | 3339620 A1 | 6/2018 |
| WO | 2004040176 A1 | 5/2004 |
| WO | WO2004040125 A1 | 5/2004 |

* cited by examiner

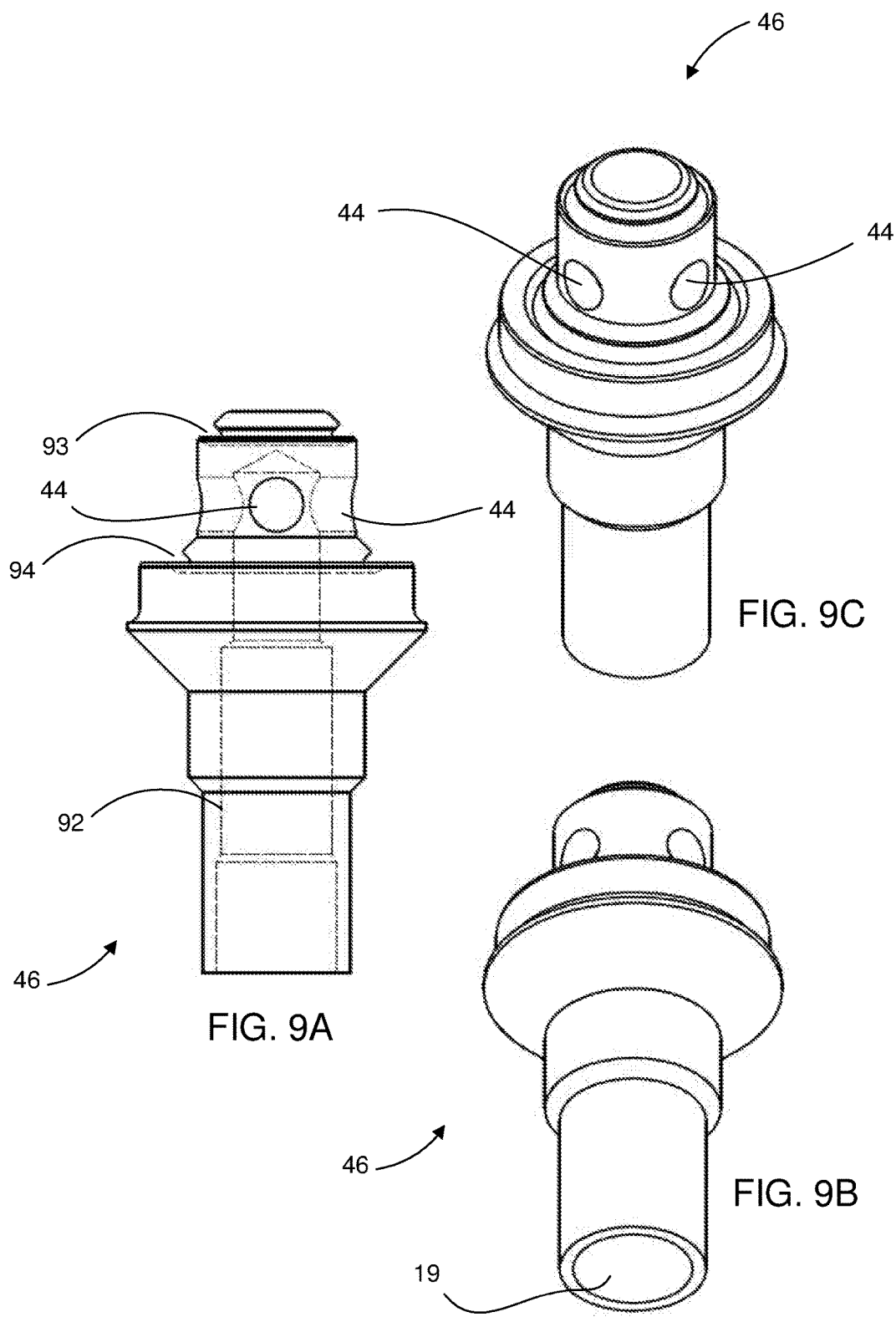

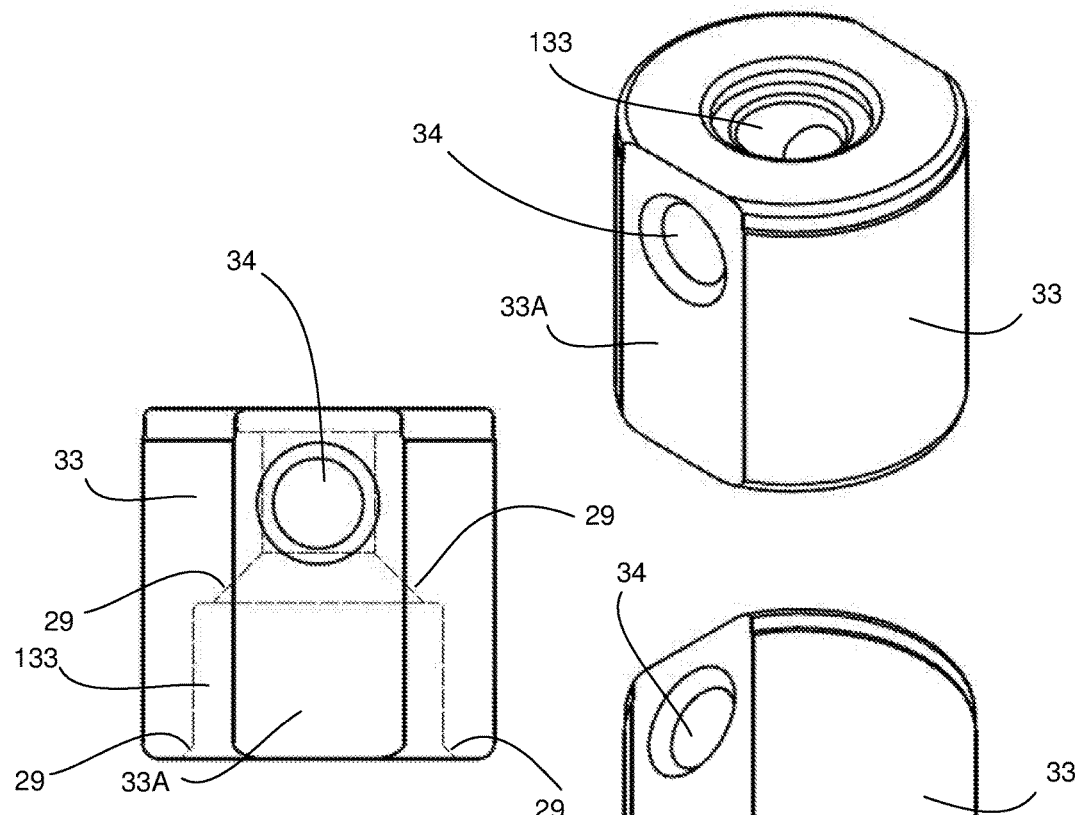

HIGH PRESSURE GAS PHASE INJECTOR

CROSS REFERENCE TO RELATED APPLICATION

The present application claims priority to U.S. patent application 62/436,827, filed Dec. 20, 2016, entitled, "High Pressure Gas Phase Injector," the content of which is incorporated by reference herein in its entirety.

TECHNICAL FIELD

The present invention relates generally to fuel systems of internal combustion engines for vehicles and, more particularly, to high pressure gaseous fuel injection and injectors therefor.

BACKGROUND

There is a continued need for expanding the flexibility of available fuels for improving emission quality of internal combustion engines. At the same time, there is pressure to maintain available power performance of these engines, while maintaining maximum or near maximum fuel economy. Those pressures apply to engines fueled with alternative fuels, such as natural gas, as well as to those fueled with gasoline.

This need is compounded by the need to provide a durable, gas phase injector that provides sufficient flow for future performance and fuel efficiency requirements, and that can be applied as an injector for direct injection into the combustion chamber of the engine.

Emission quality also encompasses hydrocarbon emissions when the engine is not operating, generating the expectation of both high speed response of the injector and near zero leak of the gas phase fuel when the injector is not energized. The materials that allow for the needed leak performance can be best met by available elastomeric compounds which have limited high temperature survivability. A solution to this is by use of a barrier or another valve in addition to the metering valve to isolate the leak prevention materials from the high gas temperatures of the combustion chamber in which the injector is positioned to supply fuel. This has been implemented with limited success for natural gas applications and some air injection applications.

SUMMARY

Example embodiments address the shortcomings discussed above and provide a robust and responsive injector with suitable protection of upstream materials from a combustion environment. In accordance with an example embodiment, an injector is provided having an inlet sealing to a gas phase fuel supply and an outlet sealing to the engine head and thereby the combustion chamber. The injector includes a metering valve that is selectively opened and closed by the logic of the engine control unit. The metering valve has a gaseous connection to an isolation valve that is opened only by the pressure presented by the gas phase fuel supply when the metering valve is opened. An armature of ferromagnetic material defines moveable control surfaces of the metering valve on the armature interior geometry. These control surfaces move with the armature when an electromagnetic coil coaxially located external to the armature has electric current passing through the coil conductor to generate a magnetic force to cause the movement of the armature toward a stator. The control surfaces sealingly engage with stationary control surfaces of the metering valve when the metering valve is in the closed state in order to prohibit fuel flow through the injector, and are spaced from the stationary control surfaces when the metering valve is in the open state in order to allow fuel to flow through the injector.

A calibration member is used to bias a spring in compression in order to provide the necessary return force to move the armature from an open position to a closed position when the electric current ceases flowing in the coil conductor and the magnetic field collapses. The calibration member is engaged with an interior surface of the stator to be fixed in place by friction forces after an initial axial movement positioning during the calibration of a metering spring force for the injector at the time of manufacturing.

The stator is engaged with an interior surface of an upper housing of the injector and fixed in place by friction forces after an initial axial movement positioning during calibration of the magnetic gap between the armature and stator for the injector at the time of manufacturing. This upper housing is engaged with an O-ring adapter at a proximal geometry and fused hermetically. The O-ring adapter has on an external geometry with features necessary to contain an O-ring and a backup ring to seal the injector to a mating geometry of a high pressure gas phase fuel supply. Additionally, a distal geometry of the upper housing of the injector is engaged with a lower housing and fused hermetically thereto.

The lower housing defines the stationary control surfaces of the metering valve on the exterior geometry of the lower housing. The lower housing is engaged and fused hermetically to an isolation valve body. The isolation valve body contains an isolation valve spring connected to a poppet of the isolation valve that biases the poppet to a closed position when the pressure of the gas phase fuel is reduced by the closing of the metering valve. With the poppet in the closed position against the distal end of the isolation valve body, the pressurized combustion gases inside the combustion chamber have limited access to the interior portion of the injector below the metering valve and are quenched if the gases pass and therefore isolate the metering valve from damaging thermal effects. The isolation valve body additionally contains external geometry that accepts a combustion seal that seals the injector to the combustion chamber and prevents combustion gas leak between the injector and the cylinder head of the internal combustion engine.

These and other features disclosed herein can be best understood from the following description and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

FIGS. 9A-9C are side and perspective views of the lower housing of the injector of FIG. 1, according to an example embodiment.

FIGS. 10A-10C are side and perspective views, of the armature of the injector of FIG. 1, according to an example embodiment.

DETAILED DESCRIPTION

Figure 1:
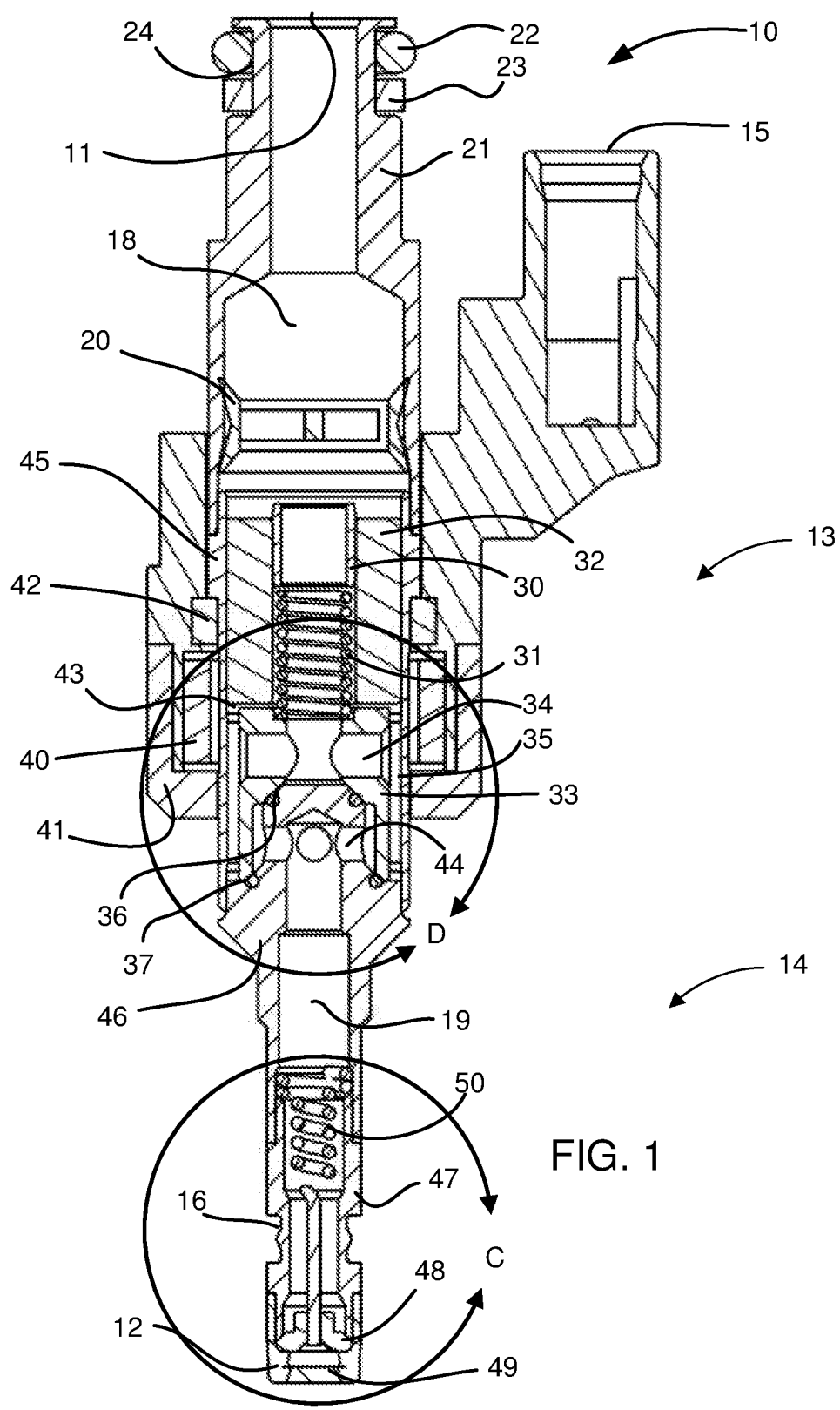
FIG. 1 is a sectional view of an injector according to an example embodiment.
Figure 2:
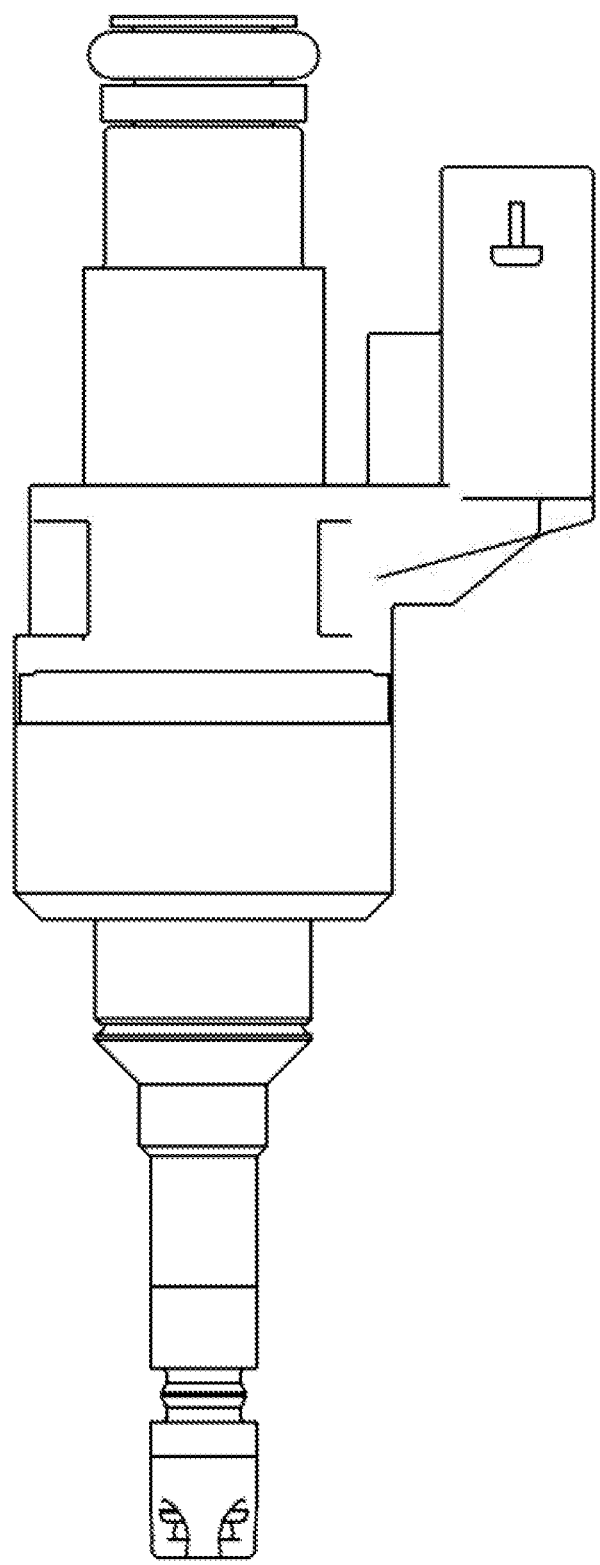
FIG. 2 is an exterior view of the injector of FIG. 1.
Figure 3:
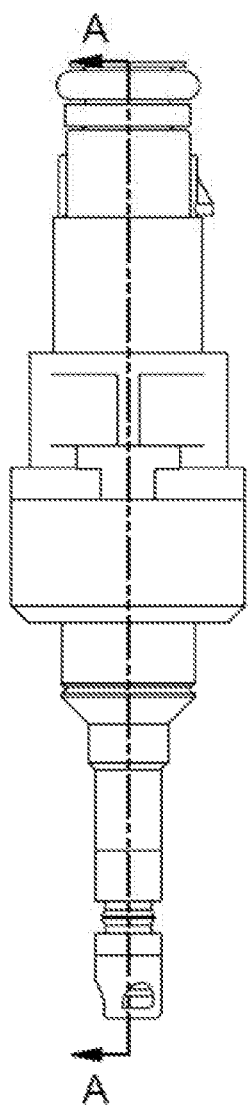
FIG. 3 is another exterior view of the injector of FIG. 1.

The following description is merely exemplary in nature and is not intended to limit the present disclosure, application, or uses.

Certain terms are used throughout the following description and claims to refer to particular system components and configurations. As one skilled in the art will appreciate, a component may be referred to by different names This disclosure does not intend to distinguish between components that differ in name but not function. In the following discussion and in the claims, the terms "including" and "comprising" are used in an open-ended fashion, and thus should be interpreted to mean "including, but not limited to . . . ."

Example embodiments of the present disclosure are described below. It should be noted that these and other example embodiments are exemplary and are intended to be illustrative of the invention rather than limiting. While the invention is widely applicable to different types of systems, it is inexpedient if not impossible to include all of the possible embodiments and contexts of the invention in this disclosure. Upon reading this disclosure, many alternative embodiments will become apparent to persons of ordinary skill in the art. Other embodiments may be utilized, and other changes may be made, without departing from the spirit or scope of the subject matter presented here.

Referring to FIGS. 1-5, an electromagnetic injector, generally indicated at 10, is shown having an inlet 11 and an outlet 12 in accordance with an example embodiment. The injector 10 includes a metering valve subassembly, generally indicated at 13, and an isolation valve subassembly, generally indicated at 14. The metering valve subassembly 13 performs the selective enabling and prohibiting of gas phase fuel flow. The isolation valve subassembly 14 opens and closes in reaction or response to interruptions of pressure as a consequence of interrupting flow by the metering valve assembly 13, as well as isolates the metering valve subassembly 13 from the combustion gas environment at the distal end of the isolation valve subassembly 14. A magnetic group, including a coil 40, a magnetic return 41, a flux washer 42, a stator 32, a magnetic air gap 43, an upper housing 45, and an armature 33 (FIGS. 1 and 4), performs power functions, e.g., converting electrical current, applied to energizing connector 15, to a magnetic driving force for selectively permitting gas phase fuel flow through the injector 10.

With reference to FIG. 1, gas phase fuel enters the inlet 11 under pressure, and flows into an interior portion 18 above metering valve subassembly 13. The gas phase fuel then transfers through a filter 20 before communicating with the metering valve subassembly 13. The interior portion 18 above metering valve subassembly 13 additionally includes a defined flow path through a calibration member 30 engaged on an interior surface of the stator 32, also being part of the defined flow path, and fixed in place by friction forces after an initial positioning (axial movement) during the calibration of metering spring force for the injector 10 at the time of manufacturing. The defined flow path further includes a space defined in the upper housing 45 in which a metering valve spring 31 of the metering valve subassembly 13 is disposed, such that the defined flow path includes the interior and inter-coil space of the metering valve spring 31. Metering valve spring 31 is disposed upstream of and is coupled to the armature 33, and provides the return force to close the metering valve subassembly 13.

Figure 4:
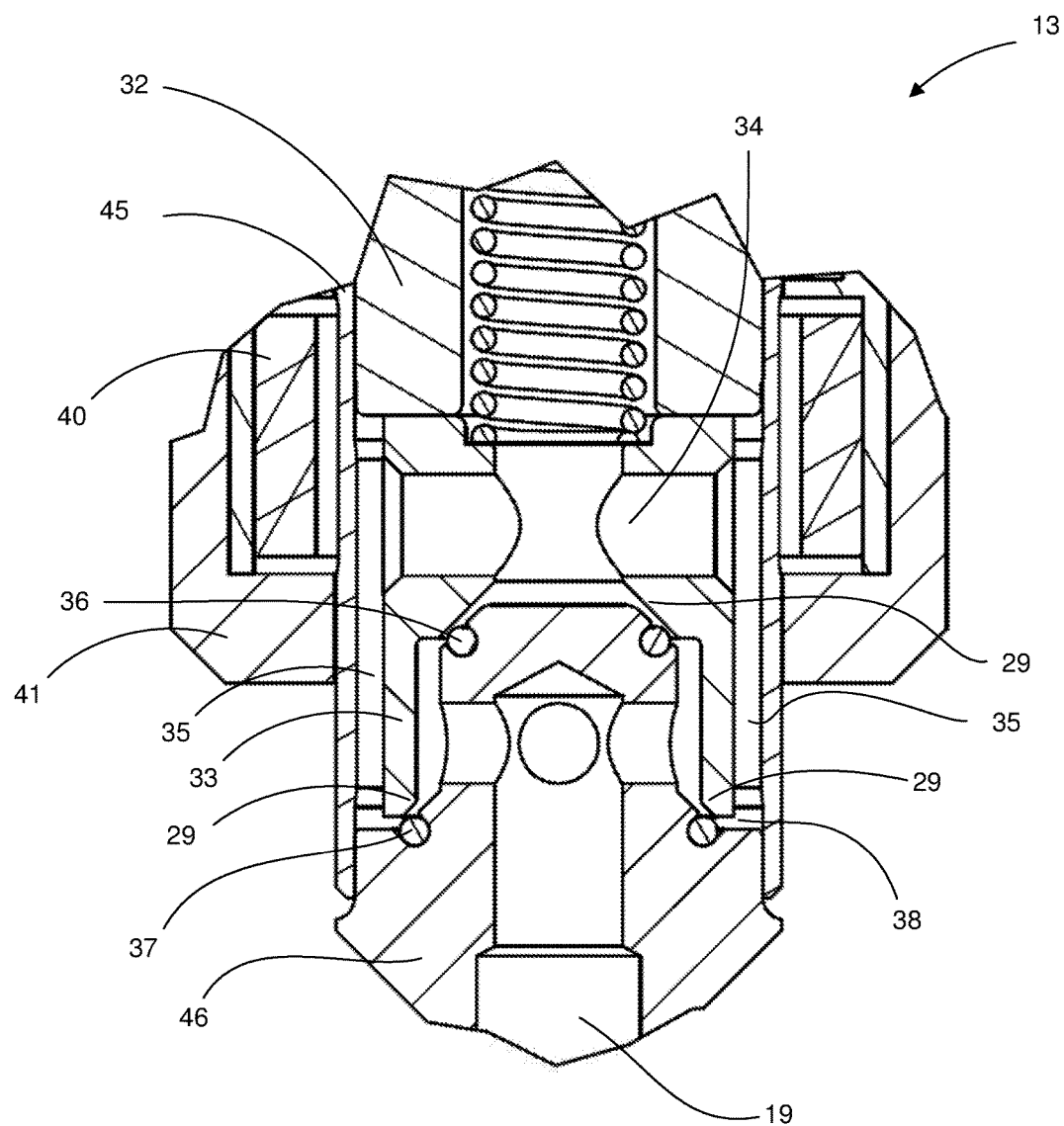
FIG. 4 is a detailed sectional view of the metering valve subassembly of the injector taken along the curve C in FIG. 1.
Figure 6B:
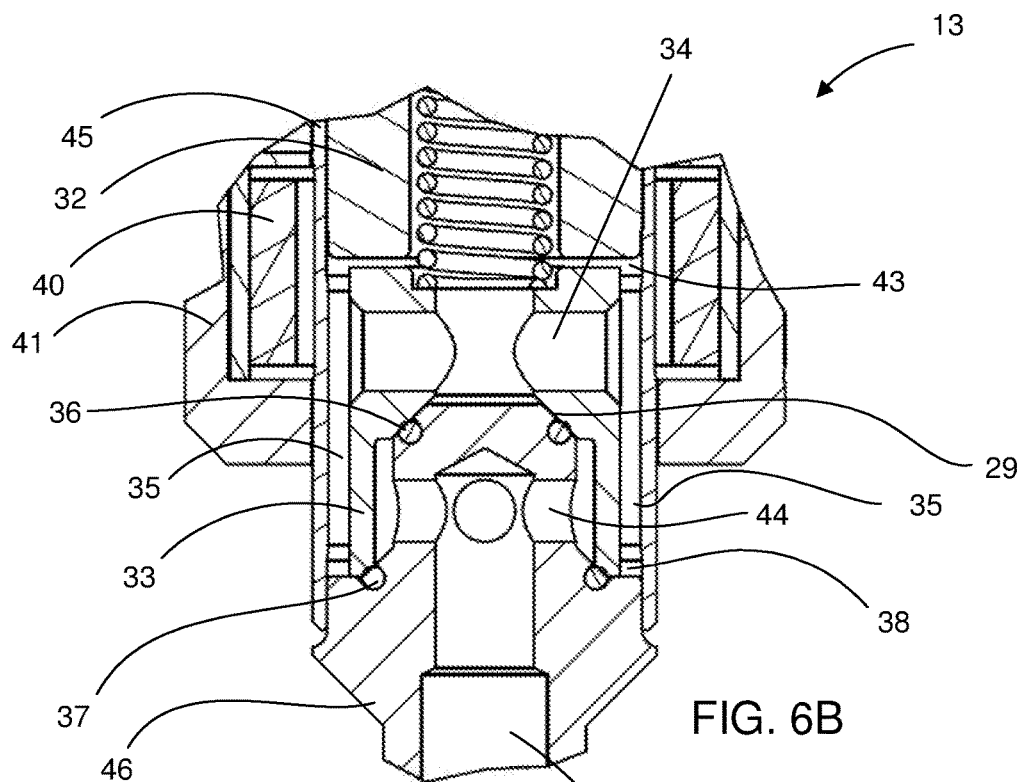
FIGS. 6A and 6B are detailed sectional views of the metering valve subassembly of the injector of FIG. 1 in the open state and the closed state, respectively.
Figure 6A:
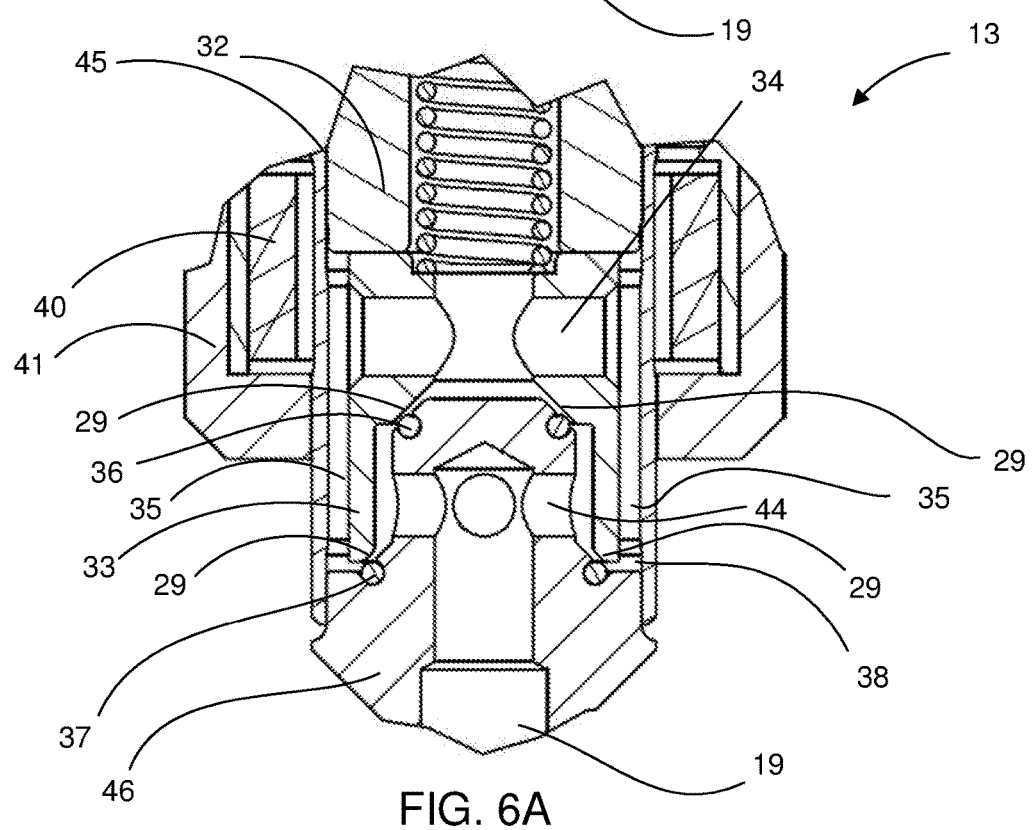

Referring to FIGS. 4, 6A and 6B, the interior portion 18 above metering valve subassembly 13, as described above, communicates with the flow geometry of armature 33. The armature 33 has a central bore 133 (FIGS. 10A-10C) that extends in a longitudinal direction and communicates with a transverse or lateral flow geometry 34 of armature 33. Transverse flow geometry 34 defines a flow path to non-annular flow geometry 35 which is disposed between and defined by at least a portion of the outside or external surface of the armature 33 and an inner surface of the upper housing 45. The armature 33 defines moveable control surfaces 29 of the metering valve subassembly 13 on the interior geometry of the armature 33. In this embodiment, the moveable control surfaces 29 engage an upper internal O-ring 36 and a lower internal O-ring 37 located in suitable O-ring geometry along the lower housing 46 when the metering valve subassembly 13 is in the closed state in order to stop the flow of gas phase fuel through the injector 10. Alternatively, the O-rings 36 and 37 may be located in suitable O-ring geometry on the armature 33, move coincident with the armature 33 and engage with stationary control surfaces 29 on the lower housing 46, or one O-ring may be located in suitable O-ring geometry on the armature 33 (and moveable therewith) and another may be stationary and located in a suitable O-ring geometry of the lower housing 46, without departing from the scope and spirit of the invention. As shown in FIG. 4, the moveable control surfaces 29 of the armature 33 include an upper control surface and a lower control surface, with the upper control surface being disposed inwardly of the lower control surface in a transverse or radial direction of injector 10. Accordingly, upper O-ring 36 has inner and outer diameters which are less than the inner and outer diameters of lower O-ring 37, respectively.

In the illustrated example embodiment, the moveable control surfaces 29 move with the armature 33. Armature 33 moves from a closed position corresponding to the metering valve subassembly 13 being in the closed state (FIG. 6B) to an open position corresponding to the metering valve subassembly 13 being in the open state (FIG. 6A) when the electromagnetic coil 40, coaxially located external to the armature 33, has electric current passing through the coil conductor to generate a magnetic force which causes the movement of the armature toward the stator 32, reducing the air gap 43 (FIG. 6B) distance to the stator 32 and opening an annular flow geometry 38 between the armature 33 and the lower housing 46 (FIG. 6A). With armature 33 moving upwardly or otherwise in an upstream direction towards inlet 11 and the gap opening between the lower control surface 29 of armature 33 and lower O-ring 37 (FIG. 6A), the annular flow geometry 38 communicates with the non-annular flow geometry 35 and defines a first flow path for gas phase fuel to flow into the gap now formed between the lower internal O-ring 37 and the lower control surface 29 of the armature 33.

Simultaneous to the gap opening between the lower control surface 29 of armature 33 and the lower internal O-ring 37 due to upward movement of armature 33, a gap is created between the upper control surface 29 of armature 33 and the upper internal O-ring 36, defining a second flow path for gas phase fuel to flow from the central bore 133 of armature 33 into the gap formed between the upper internal O-ring 36 and the upper control surface 29 of armature 33. The upper internal O-ring 36 and lower internal O-ring 37 have a round (circular) cross-section in the present embodiment, but any other shape of cross-section should be within the scope and spirit of the invention. Any plurality of the internal O-rings should also the within the scope and spirit of the invention. Bonded elastomeric seal or vulcanization may also substitute for any or both O-rings 36, 37, should also be within the scope and spirit of the invention.

Lower housing 46 includes a central bore disposed in a longitudinal direction and transverse flow geometry 44 which extends in the transverse or lateral direction. With the armature 33 in the open position corresponding to the metering valve subassembly 13 being in the open state, gas phase fuel flows into the transverse flow geometry 44 of the lower housing 46 from the first and second defined flow paths described above. Transverse flow geometry 44 communicates with a central bore of the lower housing 46 that defines a flow path communicating with an interior portion 19 of lower housing 46 below metering valve subassembly 13.

Isolation valve subassembly 14 includes isolation valve body 47 having a longitudinal cavity through which fuel flows to outlet 12. An isolation valve spring 50 is at least partly disposed within the cavity of isolation valve body 47. A poppet 48 is coupled to one end of the isolation valve spring 50 and is biased thereby to a closed position corresponding to the closed state of the isolation valve subassembly 14 in which poppet 48 sealingly contacts and engages with sealing a sealing face 47A of the distal end of isolation valve body 47. When caused to move from its closed position to an open position corresponding to the isolation valve subassembly 14 being in the open state, the poppet 48 moves in the downstream direction so that a gap or space is created between the sealing face 47A and the poppet 48 so that a fuel flow path is defined from the cavity of the isolation valve body 47 to the outlet 12. Isolation valve subassembly 14 is an outward opening valve in which poppet 48 is moved by the pressure of fuel in the cavity of isolation valve body 47, as described below.

Figure 5:
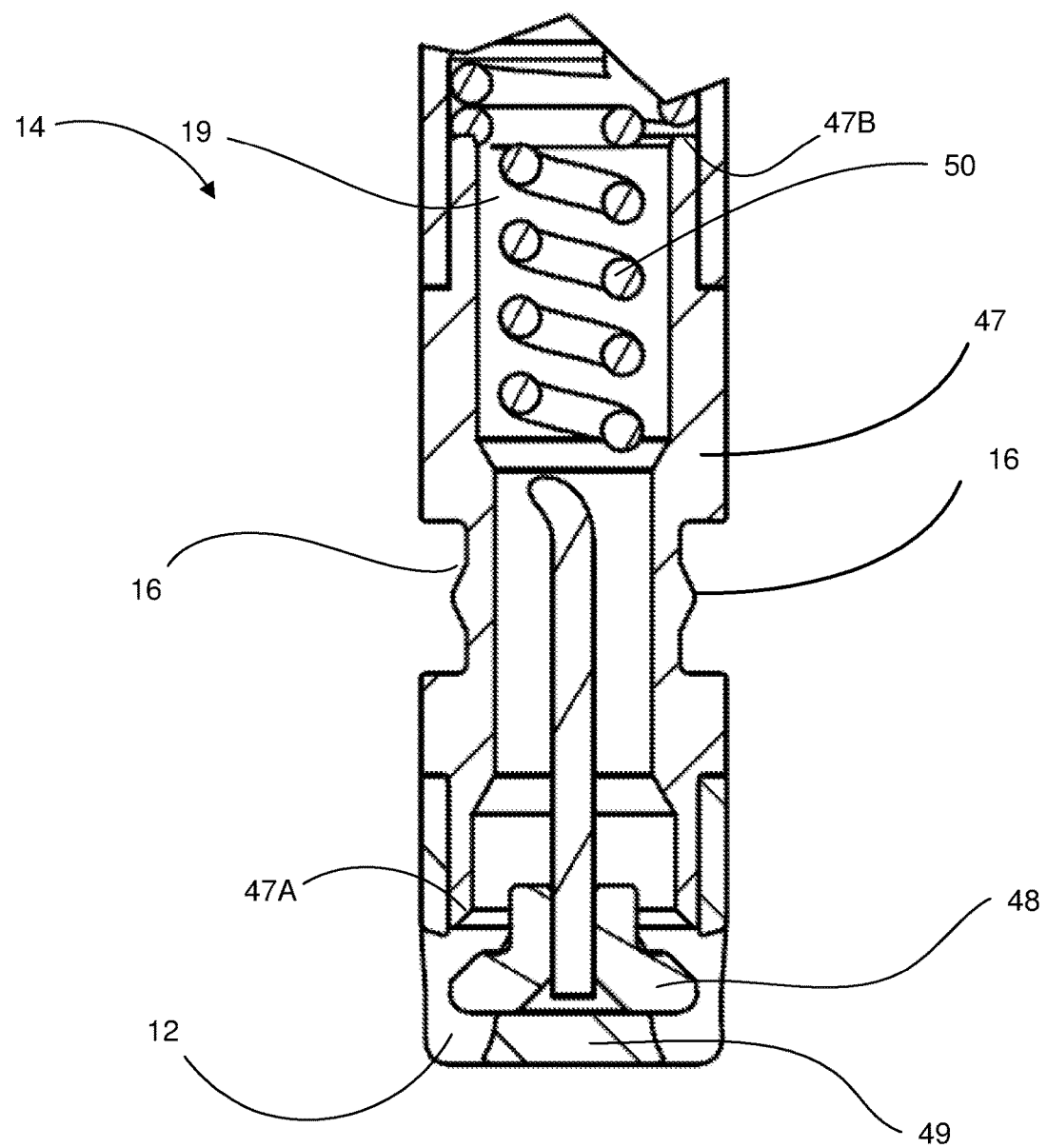
FIG. 5 is a detailed sectional view of the isolation valve subassembly of the injector taken along the curve D in FIG. 1.
Figures 7A, 7B:
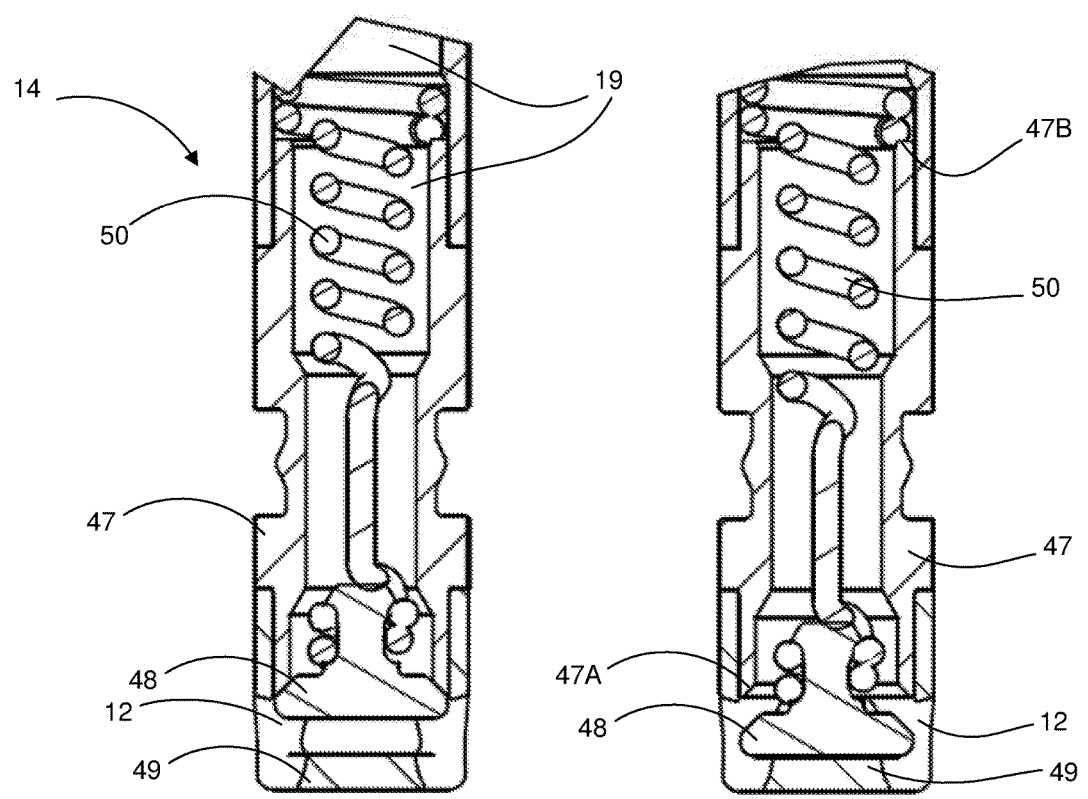
FIGS. 7A and 7B are detailed sectional views of the isolation valve subassembly of the injector of FIG. 1 in the open state and the closed state, respectively, according to an example embodiment.

With reference to FIGS. 5 and 7A-7B, the interior portion 19 below metering valve subassembly 13 communicates gas phase fuel through the isolation valve spring 50 and the gas phase fuel now impresses pressure force on the poppet 48 of the isolation valve subassembly 14. The pressure force on the poppet 48, once it overcomes the bias force of the isolation valve spring 50, axially expands at least a portion of isolation valve spring 50 and causes the poppet 48 to move downwardly and away from the sealing face 47A on the isolation valve body 47 and thereby permits gas phase fuel to flow between the poppet 48 and isolation valve body 47 into a poppet stop 49. The poppet stop 49 is coupled to a distal end of the isolation valve body 47 and includes openings that define the outlet 12 for the gas phase fuel to exit the injector 10 and enter the combustion chamber of the internal combustion engine. If the pressure force of fuel in the isolation valve body 47 is sufficient enough, or the momentum of the moving poppet 48 is sufficient enough, the poppet 48 may travel to but is limited in further travel by an interior surface of the poppet stop 49. The maximum distance poppet 48 may travel to the poppet stop 49 may be selected at manufacture and additionally this selection may determine the final mass flow rate of the injector 10. The poppet stop 49 also provides bearing guidance for axial movement of the poppet 48, and additionally limits off-axis displacement (transverse translation or freedom of movement) of poppet 48.

O-ring 22 and the backup ring 23 (FIG. 1) are located in an O-ring groove 24 of an O-ring adapter 21 and provide the seal between the injector 10 and the high pressure gas phase fuel supply.

The isolation valve body 47 has geometry to accept a combustion seal (not shown) in a combustion seal groove 16 (FIGS. 1 and 5) to provide the seal between the injector 10 and the cylinder head of the internal combustion engine.

FIGS. 9A-9C show the lower housing 46 according to an example embodiment. The lower housing 46 includes the central bore 92 through which gas phase fuel passes in a longitudinal direction towards isolation valve subassembly 14. Central bore 92 may form at least part of the interior portion 19 of the lower housing 46. As can be seen, transverse flow geometry 44 of lower housing 46 defines a transverse flow path in two transverse (lateral) directions which, in this example embodiment, are orthogonal to each other. In addition, component 90 may include ridges or grooves 93 and 94 into which upper stationary O-ring 36 and lower stationary O-ring 37 are received, respectively.

FIGS. 10A-10C show various views of armature 33, including transverse flow geometry 34 which is used to provide gas phase fuel to non-annular flow geometry 35. Transverse flow geometry 34 is in fluid communication with central bore 133 and extends from one side 33A of armature 33 to another side 33A thereof. Sides 33A of armature 33 are largely flat and disposed on opposed sides of armature 33. FIG. 10A shows interior features of armature 33, including the lower and upper control surfaces 29.

Figure 11A:
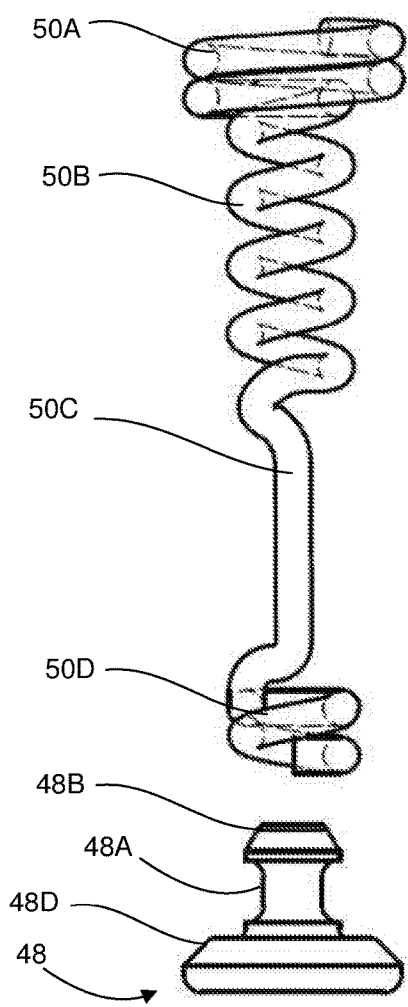
FIGS. 11A and 11B are side and perspective views, respectively, of the attachment between the poppet and the isolation valve spring by elastic engagement, according to an example embodiment.
Figure 11B:
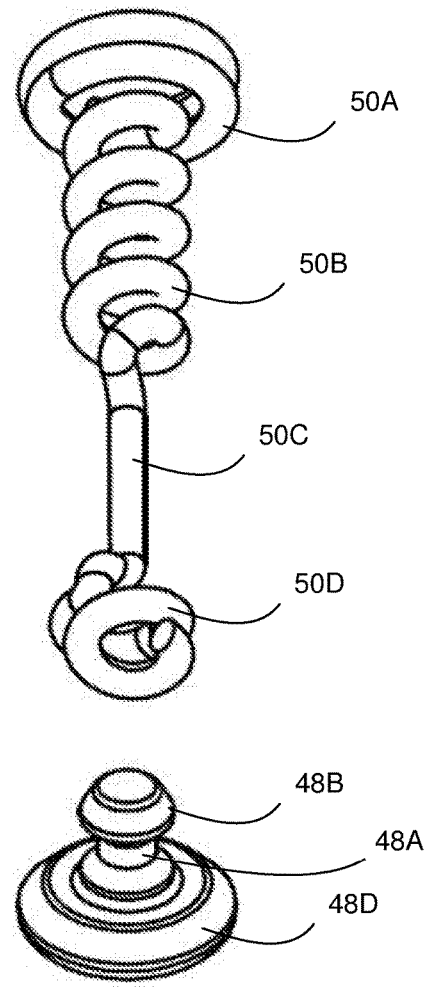

FIGS. 11A and 11B show views of isolation valve spring 50 and poppet 48 according to an example embodiment. Here, isolation valve spring 50 includes a first coiled portion 50A having a coil diameter that is larger than an inner diameter of step or ledge 47B appearing at or near the top of isolation body 47 (see FIGS. 5, 7B and 13B) so that first coiled portion 50A rests on top of step 47B and is fixed in position within injector 10. Isolation spring 50 further includes a second coiled portion 50B having a smaller diameter dimension that the diameter dimension of first coiled portion 50A. The spacing between adjacent coils in second coiled portion 50B is greater than the spacing between adjacent coils of first coiled portion 50A. Unlike the coils of first coiled portion 50A, the coils of second coiled portion 50B are adapted to collectively expand in the axial or longitudinal direction within isolation valve body 47 in response to fuel pressure in isolation valve body 47 when isolation valve 50 switches between open and closed states.

With continued reference to FIGS. 11A and 11B, isolation valve spring 50 includes a largely linear portion 50C coupled between a lower, distal end of second coiled portion 50B, and an upper end of a third coiled portion 50D. The coils of third coiled portion 50D are dimensioned so that the coils tightly wrap around groove portion 48A of poppet 48, and with the outer diameter of groove portion 48A being smaller than the outer diameter of end portion 48B of poppet 48, a secure attachment between isolation valve spring 50 and poppet 48 is provided. FIGS. 7A and 7B illustrate the attachment between isolation valve spring 50 and poppet 48 within isolation valve body 47. As can be seen, poppet 48, disposed at or near the outlet 12 of injector 10, is axially spaced from first coiled portion 50A and second coiled portion 50B of isolation valve spring 50.

In an example embodiment, first coiled portion 50A, second coiled portion 50B, linear portion 50C, and third coiled portion 50D are integrally formed as a unitary member. In another example embodiment, first coiled portion 50A, second coiled portion 50B, linear portion 50C, and third coiled portion 50D are assembled from a plurality of parts which are connected to one another during manufacture of isolation valve spring 50.

Poppet 48 includes a sloped or inclined surface 48D which is sized and dimensioned to sealingly contact sealing face 47A of isolation valve body 47 when the isolation valve subassembly 14 is in the closed state.

Figure 8B:
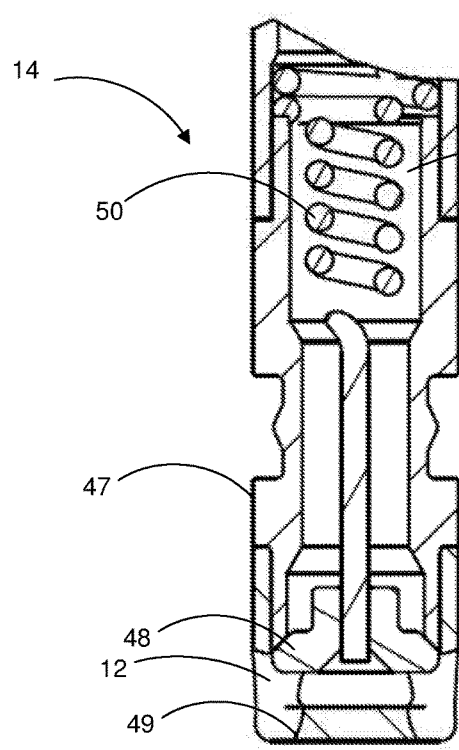
FIGS. 8A and 8B are detailed sectional views of the isolation valve subassembly of the injector of FIG. 1 in the open state and the closed state, respectively, according to another example embodiment.
Figure 8A:
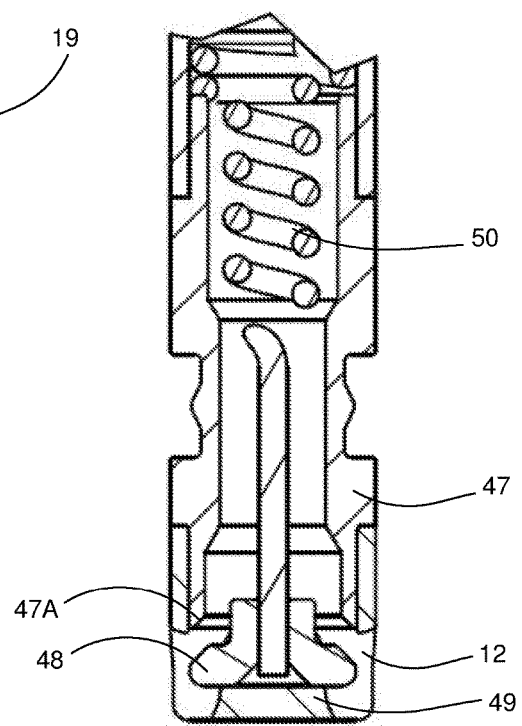
Figure 12A:
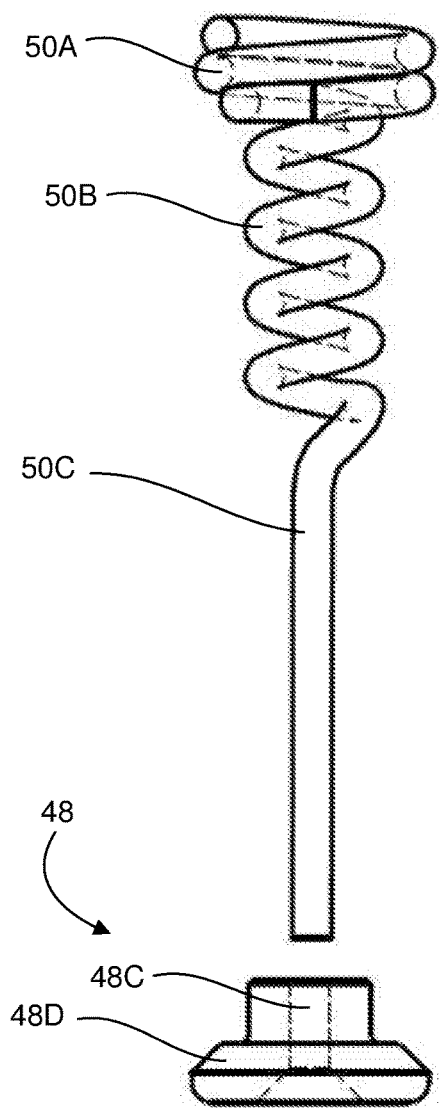
FIGS. 12A and 12B are side and perspective views, respectively, of the attachment between the poppet and the isolation valve spring by frictional engagement, according to another example embodiment.
Figure 12B:
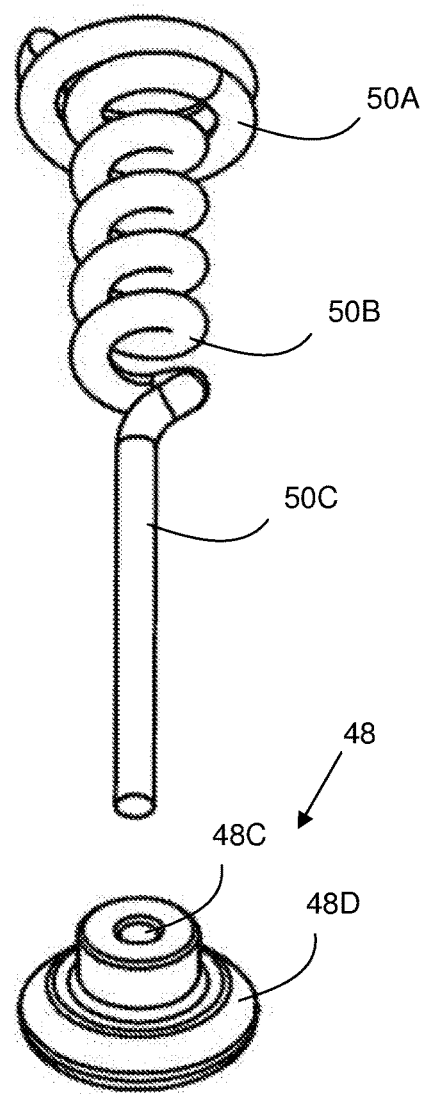

FIGS. 12A and 12B illustrate isolation valve spring 50 and poppet 48 according to another example embodiment. Here, isolation valve spring 50 includes first and second coiled portions 50A and 50B, respectively, as well as linear portion 50C as described above with respect to the example embodiment of FIGS. 11A and 11B. However, isolation valve spring 50 in FIGS. 12A and 12B does not include a third coiled portion 50D, and instead the isolation valve spring 50 ends with linear portion 50C. Poppet 48 includes a bore 48C into which the end of linear portion 50C is inserted and in one example embodiment extends therethrough. The distal end portion of linear portion 50C engages with or otherwise attaches to poppet 48 through use of any of a number of known attachment mechanisms and techniques including frictional engagement, welding, brazing and soldering. FIGS. 8A and 8B depict isolation valve spring 50 and poppet 48 of FIGS. 12A and 12B in isolation valve subassembly 14.

FIGS. 11A-11B and 12A-12B present different mechanisms for attaching isolation valve spring 50 with poppet 48, and it is understood that other attachment mechanisms may be employed without departing from the spirit and scope of the invention.

Figures 13A, 13B, 13C:
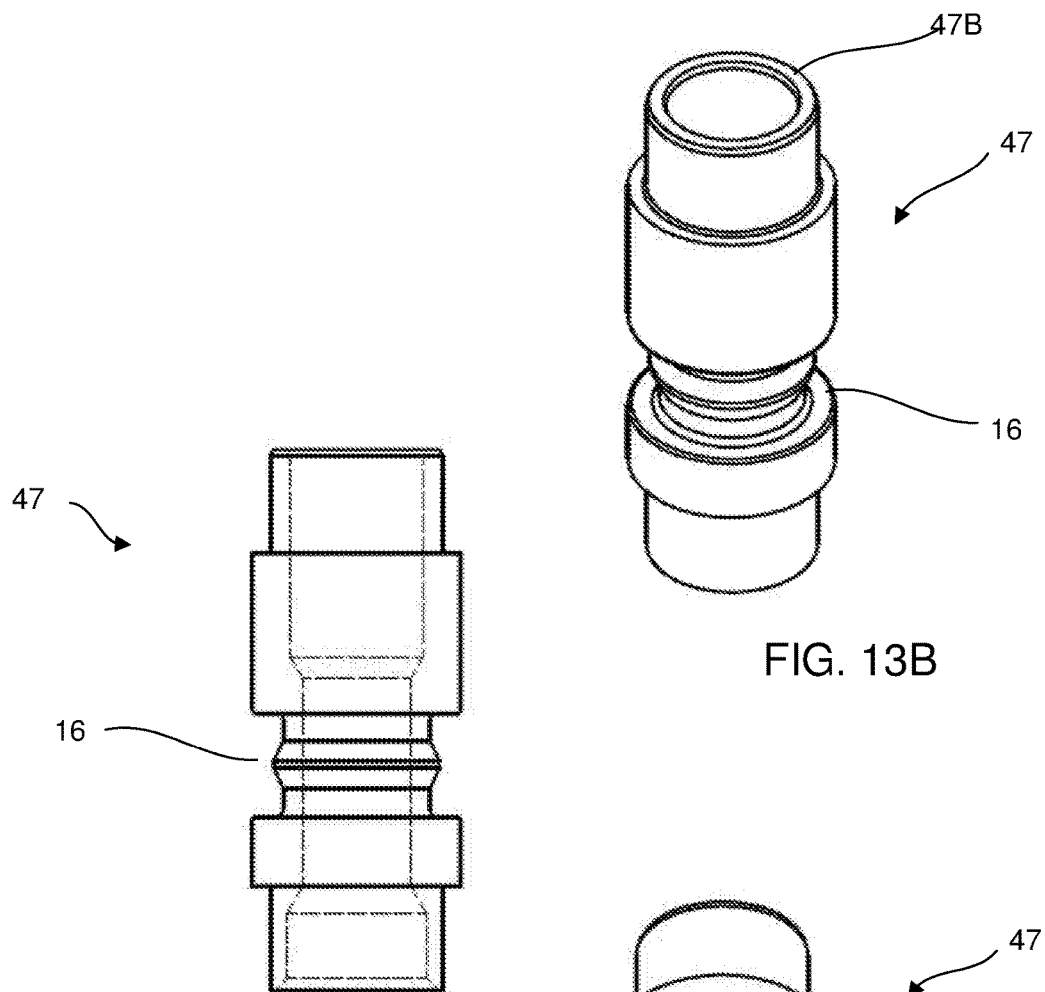
FIGS. 13A-13C show side and perspective views of the isolation valve body of the injector of FIG. 1.

FIGS. 13A-13C illustrate isolation valve body 47 according to an example embodiment.

Figure 14B:
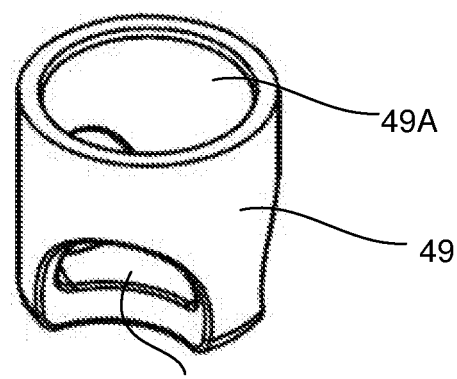
FIGS. 14A-14C are side and perspective views of a poppet stop of the injector of FIG. 1, according to an example embodiment.
Figure 14A:
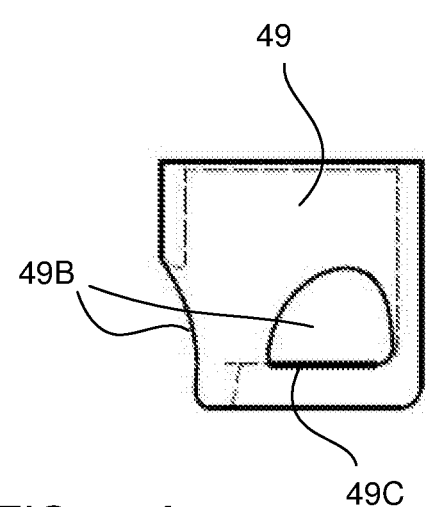
Figure 14C:
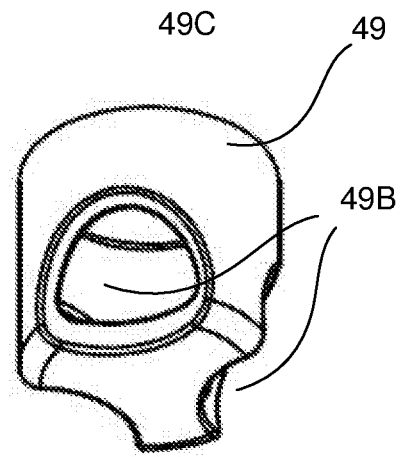

FIGS. 14A-14C illustrate poppet stop 49 according to an example embodiment. As shown, poppet stop 49 is largely cylindrically shaped having an enlarged upper opening 49A at the upper portion and a plurality of lower openings 49B which at least partly form outlet 12 of injector 10. Stop surface 49C is largely flat and dimensioned and spaced for providing a stopping surface which sets the outer extent by which poppet 48 extends from the distal end of isolation valve 47.

Isolation valve subassembly 14 is described above and illustrated as an outward opening valve subassembly. It is understood that injector 10 may utilize other isolation valve subassemblies, and in particular other outward opening isolation valve subassemblies.

In addition, metering valve subassembly 13 of injector 10 is described above and illustrated as utilizing an electromagnetic based actuator for moving the armature 33 between closed and open positions. It is understood that metering valve subassembly 13 may alternatively utilize piezoelectric or magnetostrictive based actuators for moving the armature 33.

It is to be understood that the embodiments shown and described herein are only illustrative of the principles of the present invention and that various modifications may be implemented by those skilled in the art without departing from the scope and spirit of the invention.

What is claimed is:

1. An injector having an inlet and an outlet for injecting a fuel into an internal combustion engine, the injector comprising:
    an upper housing;
    a moveable armature disposed at least partly in the upper housing and having a plurality of control surfaces and a bore, the control surfaces of the armature comprising an upper control surface and a lower control surface;
    a lower housing coupled to the upper housing and including a bore and a plurality of stationary control surfaces comprising a lower stationary control surface and an upper stationary control surface, the upper and lower stationary control surfaces and the moveable armature forming at least part of a metering valve of the injector;
    a spring engaging the armature so that the armature is biased by the spring towards closure of the control surfaces of the armature against the stationary control surfaces of the lower housing, the closure defining a closed position of the metering valve which prevents the fuel from exiting the outlet;
    an electromagnetic coil disposed relative to the armature such that passing a current through the electromagnetic coil causes the moveable armature to move between a first position corresponding to the closed position of the metering valve and a second position corresponding to an open position of the metering valve in which the control surfaces of the moveable armature are spaced from the stationary control surfaces of the lower housing;
    a non-annular flow geometry defined between an exterior surface of the moveable armature and an interior surface of the upper housing;
    wherein the moveable armature includes a transverse flow path in fluid communication with the bore of the moveable armature and the non-annular flow geometry, and the lower housing includes a transverse flow path in fluid communication with the bore of the lower housing such that upon the moveable armature moving from the first position to the second position, a first flow path is formed between the non-annular flow geometry and the transverse flow geometry of the lower housing through a space between the lower stationary control surface and the lower control surface of the moveable armature, and a second flow path is formed between the bore of the moveable armature and the transverse flow geometry of the lower housing through a space between the upper stationary control surface and the upper control surface of the moveable armature.

2. The injector of claim 1, further comprising an isolation valve disposed between the transverse flow geometry of the lower housing and the outlet of the injector and having an interior in fluid communication with the bore of the lower housing, the isolation valve opening upon a pressure of the fuel in the interior of the isolation valve exceeding a predetermined pressure level, and closing otherwise.

3. The injector of claim 2, wherein upon the metering valve being in the open position, the inlet of the injector is in fluid communication with the outlet thereof through the metering valve and the isolation valve, and upon the metering valve being in the closed position, the first and second flow paths are closed so as to prevent the fuel to pass to the outlet.

4. The injector of claim 2, wherein the isolation valve is an outwardly opening isolation valve.

5. The injector of claim 2, wherein the isolation valve comprises a valve body having a first end portion coupled to a distal end of the lower housing and a second end portion, a poppet moveable between a first position in sealing engagement with a sealing surface of the second end portion of the valve body of the isolation valve corresponding to a closed state of the isolation valve and a second position in which the poppet is a spaced distance from the sealing surface of the second end portion of the valve body corresponding to an open state of the isolation valve, and a bias member coupled to the poppet so as to bias the poppet towards the first position, the poppet moving from the first position to the second position responsive to a pressure level of fuel in the valve body exceeding a bias force presented on the poppet by the bias member, the pressure level of fuel in the valve body exceeding the bias force upon the metering valve being in or moving to the open position, the isolation valve being in the open position permitting fuel to exit the injector through the outlet thereof.

6. The injector of claim 5, wherein the isolation valve further comprises a poppet stop coupled to the second end portion of the valve body and having a stop surface which is a maximum distance the poppet may be spaced from the sealing surface of the second end portion of the valve body when the isolation valve is in the open position, the poppet stop include one or more openings which at least partly form the outlet of the injector, the poppet stop providing guidance for axial movement of the poppet.

7. The injector of claim 5, wherein the bias member is operatively in one of compression and tension.

8. The injector of claim 5, wherein the valve body of the isolation valve includes an interior bore, and a mass flow rate of fuel through the isolation valve being based at least in part upon at least one dimension of the interior bore of the valve body and an open distance of the poppet relative to the sealing face of the second end portion of the valve body of the isolation valve.

9. The injector of claim 1, further comprising an annular flow geometry in fluid communication with the non-annular flow geometry, wherein the first flow path includes the annular flow geometry disposed between the non-annular flow geometry and the space between the lower stationary control surface and the lower control surface of the armature.

10. The injector of claim 1, wherein the injector is a compressed natural gas injector.

11. An injector having an inlet and an outlet for injecting a fluid, the injector comprising:
an upper housing;
a moveable armature disposed at least partly in the upper housing and having a plurality of control surfaces and a bore, the control surfaces of the armature comprising an upper control surface and a lower control surface;
a lower housing coupled to the upper housing and including a bore and a plurality of stationary control surfaces comprising a lower stationary control surface and an upper stationary control surface, the upper and lower stationary control surfaces and the moveable armature forming at least part of a metering valve of the injector;
a spring engaging the armature so that the armature is biased by the spring towards closure of the control surfaces of the armature against the stationary control surfaces of the lower housing, the closure defining a closed state of the metering valve which prevents the fluid from exiting the outlet;
the moveable armature being moveable between a first position corresponding to the closed state of the metering valve and a second position corresponding to an open state of the metering valve in which the control surfaces of the moveable armature are spaced from the stationary control surfaces of the lower housing;
a first flow geometry defined between the moveable armature and an interior surface of the upper housing;
wherein the moveable armature includes a transverse flow path in fluid communication with the bore of the moveable armature and the first flow geometry, and the lower housing includes a transverse flow path in fluid communication with the bore of the lower housing such that upon the moveable armature moving from the first position to the second position, a first flow path is formed between the first flow geometry to the transverse flow geometry of the lower housing through a space between the lower stationary control surface and the lower control surface of the moveable armature, and a second flow path is formed between the bore of the moveable armature and the transverse flow geometry of the lower housing through a space between the upper stationary control surface and the upper control surface of the moveable armature, and upon the moveable armature moving from the second position to the first position, the lower control surface of the moveable armature sealingly engages with the lower stationary control surface and the upper control surface of the moveable armature sealingly engages with the upper stationary control surface so as to prevent fuel from flowing from the upper housing to within the lower housing.

12. The injector of claim 11, further comprising an isolation valve disposed between the transverse flow geometry of the lower housing and the outlet of the injector and having an interior in fluid communication with the bore of the lower housing, the isolation valve opening upon a pressure of the fluid in the interior of the isolation valve exceeding a pressure level, and closing otherwise.

13. The injector of claim 12, wherein upon the metering valve being in the open state, the inlet of the injector is in fluid communication with the outlet thereof through the metering valve and the isolation valve.

14. The injector of claim 12, wherein the isolation valve is an outwardly opening isolation valve.

15. The injector of claim 12, wherein the isolation valve comprises a valve body having a first end portion coupled to a distal end of the lower housing and a second end portion, a poppet moveable between a first position in sealing engagement with a sealing face of the second end portion of the valve body of the isolation valve corresponding to a closed state of the isolation valve and a second position in which the poppet is a spaced distance from the sealing face of the second end portion of the valve body corresponding to an open state of the isolation valve, and a bias member coupled to the poppet so as to bias the poppet towards the first position, the poppet moving from the first position to the second position responsive to a pressure level of fuel in the valve body exceeding a bias force presented on the poppet by the bias member, the pressure level of fuel in the valve body exceeding the bias force upon the metering valve being in or moving to the open state, the isolation valve being in the open state permitting fuel to exit the injector through the outlet thereof.

16. The injector of claim 15, wherein the bias member is operatively in tension when the isolation valve is in the closed state.

17. The injector of claim 15, wherein the bias member is operatively in compression when the isolation valve is in the closed state.

18. The injector of claim 15, wherein the isolation valve further comprises a poppet stop coupled to the second end portion of the valve body and having a stop surface which is a maximum distance the poppet may be spaced from the sealing face of the second end portion of the valve body when the isolation valve is in the open state, the poppet stop includes one or more openings which at least partly form the outlet of the injector.

19. The injector of claim 18, wherein the poppet stop provides bearing guidance for axial movement of the poppet of the isolation valve.

20. The injector of claim 15, wherein the valve body of the isolation valve includes an interior bore, and a mass flow rate of fuel through the isolation valve being based at least in part upon at least one dimension of the interior bore of the valve body.

21. The injector of claim 15, wherein a mass flow rate of fuel through the isolation valve is based at least in part upon an open distance of the poppet relative to the sealing face of the second end portion of the valve body of the isolation valve.

22. The injector of claim 11, wherein the first flow geometry comprises a non-annular flow geometry.

23. The injector of claim 22, further comprising an annular flow geometry, wherein the first flow path includes the annular flow geometry disposed between the non-annular flow geometry and the space between the lower stationary control surface and the lower control surface of the moveable armature.

24. The injector of claim 11, wherein the injector is a compressed natural gas injector and the fluid comprises a compressed natural gas fuel.

25. The injector of claim 11, further comprising an upper ring and a lower ring disposed in or on the lower housing, wherein the upper stationary control surface and the lower stationary control surface comprise a surface of the upper ring and a surface of the lower ring, respectively.

* * * * *